April 12, 1932.   M. SIDON   1,853,088
BEAM COMPASS AND MEASURING DEVICE
Filed June 19, 1929
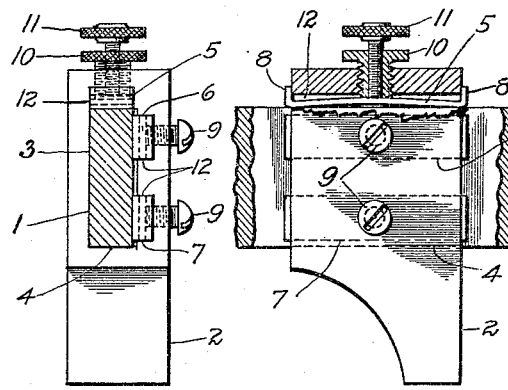
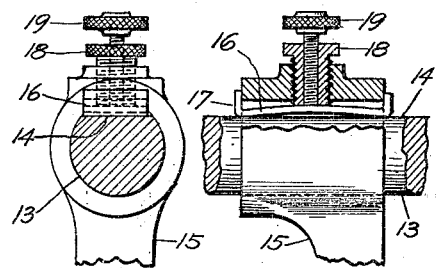
Fig.1   Fig.2   Fig.3   Fig.4
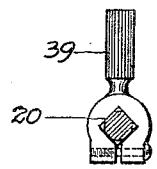
Fig.8
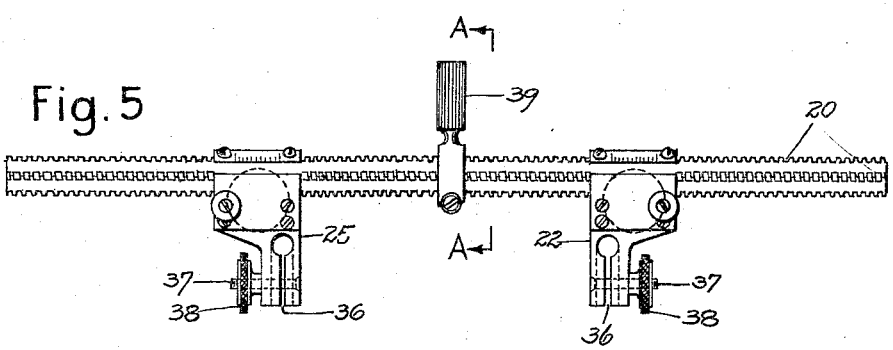
Fig.5
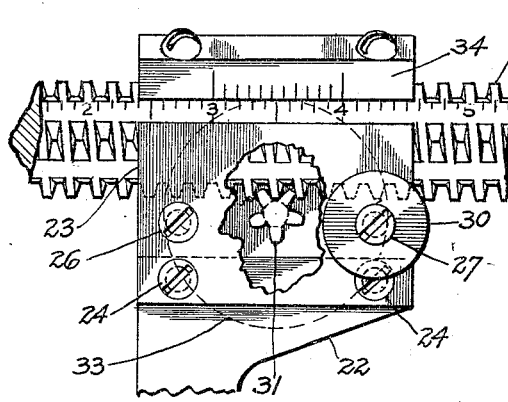
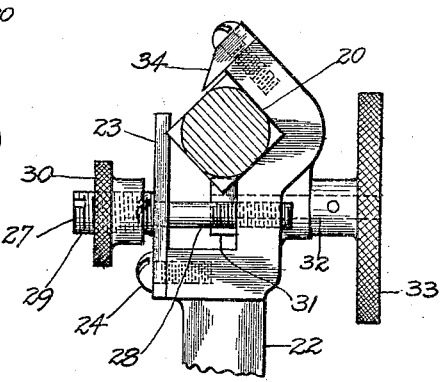
Fig.6   Fig.7
WITNESSES:
INVENTOR:
Max Sidon Patented Apr. 12, 1932

1,853,088

UNITED STATES PATENT OFFICE

MAX SIDON, OF WOODSIDE, NEW YORK

BEAM-COMPASS AND MEASURING DEVICE

Application filed June 19, 1929. Serial No. 372,046.

The object of my invention is to provide a beam instrument that may be adapted to be used as a drawing instrument as for instance a beam compass or as a measuring instrument like a vernier-gage inside or outside calipers or other similar purpose, that can be relatively cheaply manufactured, although capable of highly satisfactory results and that can be quickly and accurately adjusted as hereinafter fully described and claimed.

My invention is illustrated in the accompanying drawings, wherein—

Fig. 1 is a side-view of Fig. 2, both showing one form embodying the principles of my invention in connection with a beam of rectangular cross-section. Fig. 3 is a side-view of Fig. 4, both showing another application of the principles of my invention in connection with a beam of circular cross-section. Fig. 5 is an arrangement of another form of application of my invention in connection with a beam of square cross-section. Fig. 6 an enlarged elevation of one of the sliding members with beam shown in Fig. 5 and Fig. 7 is a side-view of Fig. 6. Fig. 8 a side-view of the handle of the compasses looking in the direction A—A of Fig. 5.

Referring to Fig. 1, 1 is a rectangular shaped beam, 2 one of the sliding members (there are usually two employed in connection with one beam). This sliding member 2 is only fitted to the beam 1 on sides 3 and 4, while there is a slight space between the other two sides and the corresponding surfaces of the beam. In recesses 12, friction members 5, 6 and 7 are inserted, these friction members being preferably made of flexible material and are held against longitudinal displacement by angular extensions 8. The friction members 6 and 7 are forced against the beam 1 by adjustable screws 9, while friction member 5 is similarly acted upon by the tapped and knurled screw 10. Into the tapped hole of knurled screw 10 fits the knurled screw 11. It will be noted, that by adjusting the screws 9 and 10, the friction members 5, 6 and 7 may be brought in as close frictional contact with beam 1 as desired, thereby eliminating all rocking motion of the sliding member on the beam, so essential for the satisfactory performance of this type of instrument and bringing about the same result as if the sliding member 2 had been accurately fitted to all four sides of the beam 1. It will also be seen, that although all rocking movement can be eliminated by such adjustments, it will readily permit of placing the sliding member into any position upon the beam by merely sliding it there without the necessity of tightening or loosening any screws before or after the sliding member has been repositioned upon the beam. Sliding members, thus slidably arranged on the beam will not become displaced when the instrument is used as a drawing instrument or inside or outside calipers i. e. if pressure is applied on the sliding members some distance away from the beam. However, if it should be desirable to lock the sliding member to the beam the screw 11 may be applied to force friction-member 5 with sufficient pressure against the beam to bring about this effect.

If screw 11 is retracted the pressure of the friction-member 5 against the beam 1 that obtained before will be reestablished and the sliding member may be readjusted on the beam as explained.

Referring to Figures 3 and 4 a similar effect is produced as above described in connection with a round bar 13, provided with a flat surface 14, upon which is slidably arranged the member 15, carrying in a recess the friction member 16, the latter being prevented from longitudinal displacement by the angular extensions 17. The tapped knurled screw 18 serves to force the friction member 16 against the flat surface 14 of beam 13, with any desired pressure while the knurled screw 19 acts as set-screw.

In Figures 5, 6, 7 and 8 is illustrated another application of my invention.

In this instance I am using a square beam edgewise i. e. with "two diametrically opposite edges in a vertical position", because its cross-section is strongest against bending when placed in this position and for constructional reasons, which will become apparent later. Sliding members 22 and 25 are shaped to fit a square beam 20 on two sides only. These sliding members 22 and 25 are exactly alike except they are right hand and left hand, and by describing one, the other will be likewise understood. Thus, I will describe sliding member 22 as illustrated in Figures 6 and 7. A pressure plate 23, of semi-flexible material, is secured to sliding-member 22 by screws 24. This pressure plate 23 is arranged to force the beam 20 onto the corresponding surfaces of the sliding member 22 and screws 26 and 27 serve to permit adjustment of the pressure with which the sliding member 22 and the beam 20 are brought in frictional contact with each other. It will be noted, that while screw 26 is of the ordinary kind, screw 27 is shouldered. It has a small diameter 28 threaded on one end, and a threaded larger diameter 29. On the larger diameter 29 fits the knurled nut 30, for the purpose explained later. The beam 20 is provided with teeth on all four corners formed by the intersection of the four flat longitudinal sides. These teeth are parts of a helical thread cut with a threading die, a method, that decreases the cost of making such teeth considerably and which can be applied to any beam of suitable cross-section. With these teeth meshes pinion 31, the shaft extension 32 of which has rigidly mounted thereon a finger-wheel 33. A vernier-plate 34 is secured to sliding member 22, to register with a scale or scales on the beam 20.

When using this instrument, the pressure plate 23 is adjusted by the screws 26 and 27 to prevent any rocking motion on the beam and to suit the sensitivity of the user, but allowing the sliding member 22 to be positioned readily anywhere upon the beam by merely sliding it, while by means of operating finger-wheel 33 and thereby pinion 31, the sliding member 22 may be placed exactly where desired by observing the scale and vernier. If the instrumment is used as a beam compass, there is rarely a necessity to permanently fasten the sliding member to the beam. However, when used as a measuring instrument it is desirable to do so and for this reason the knurled nut 30 may be screwed up tightly against the pressure-plate 23, thus bringing the beam 20 and the sliding member 22 into such close frictional contact as to preclude any movement of the one upon the other.

By unscrewing the knurled nut 30 the frictional relation between the beam 20 and the sliding member 22 existing before said knurled nut 20 was applied will be reestablished and the sliding member 22 may again be slid on said beam 20 without any readjustment of the pressure-plate 23 being necessary to eliminate any rocking motion of the sliding-member 22 on beam 20.

To facilitate rotating the instrument when used as a compass, particularly to draw smaller circles, the handle 39 is provided, which is slidably clamped to the beam 20 as shown in Fig. 5, so it may be readily removed if the beam 20 is used for either purposes.

Fig. 5 shows the sliding members 22 and 23 equipped with slotted holes 36 into which numerous attachments for drawing or measuring may be clamped by the stationary screw 37 and the knurled nut 38, but it will be understood the sliding member 22 may be so designed as to suit only a single purpose.

While I have described in detail some forms, constructions and arrangements of my invention, it is evident many other modifications may be made to conform to specific requirements without departing from the spirit of my invention, and I therefore do not limit myself to those shown.

What I claim as new and desire to secure by Letters Patent, is:

1. An instrument of the class described the sliding member whereof is loosely fitting upon a beam and having adjustable means to bring the sliding member and the beam into close frictional contact with each other, thereby eliminating rocking movement of the sliding member around the axis of the beam and rocking movement of the sliding member lengthwise of the beam, but permitting of ready adjustment and readjustment of the sliding-member by sliding in a longitudinal direction of and on the beam.

2. An instrument of the class described the sliding member whereof is loosely fitting upon a beam and having adjustable means to bring the sliding member and the beam into close frictional contact with each other, thereby eliminating rocking movement of the sliding member around the axis of the beam and rocking movement of the sliding member lengthwise of the beam but permitting adjustment and readjustment of the sliding-member by sliding in a longitudinal direction of and on the beam without the necessity of changing the frictional relation of the sliding member with the beam, before or after the adjustment has been made.

3. An instrument of the class described, the sliding member whereof is loosely fitting upon a beam and having adjustable means to bring said sliding-member and said beam into close frictional contact with each other, thereby eliminating rocking movement of said sliding-member around the axis of said beam and rocking movement of said sliding-member lengthwise of said beam but permitting adjustment and readjustment of said sliding member by sliding in a longitudinal direction of and on said beam without the necessity of changing the frictional relation of said sliding member with the said beam, before or after the adjustment has been made, and other means to more firmly secure or lock the said sliding member on said beam.

4. An instrument of the class described, the sliding member whereof is loosely fitting upon a beam and having adjustable means to bring said sliding-member and said beam into close frictional contact with each other and other means cooperating with above mentioned adjustable means to more firmly secure or lock said sliding-member to said beam, said other means reestablishing the frictional relations existing between said sliding-member and said beam when made inoperative.

5. An instrument of the class described, the beam of which is provided with indentations or teeth on one or more of its corners formed by the intersection of its flat surfaces and means cooperating with said indentations or teeth and carried by members adapted to slide upon said beam to more accurately adjust said members upon said beam.

6. An instrument of the class described having a beam used edgewise, the longest dimension of its cross-section being essentially parallel with the centerline of the sliding-members adapted to slide on said beam.

7. As a new article of manufacture, a beam, adapted to be used for instruments of the class described, having indentations or teeth cut in one or more of its corners the latter formed by the intersection of the longitudinal surfaces of said beam.

8. As a new article of manufacture, a beam, for an instrument of the class described, with indentations or teeth cut in one or more of its corners, the latter formed by the intersection of the longitudinal surfaces of said beam, said longitudinal surfaces being provided with one or more scales for the purpose set forth.

9. As a new article of manufacture a beam, the corners of which are provided with indentation or teeth, said corners being formed by the intersection of the longitudinal surfaces of said beam, said indentation or teeth being portions of a helix the centerline of which is parallel with the longitudinal axis of said beam.

MAX SIDON.